(12) United States Patent
Cao et al.

(10) Patent No.: US 12,306,492 B2
(45) Date of Patent: May 20, 2025

(54) DISPLAY PANEL, METHOD FOR MANUFACTURING SAME, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Wei Cao, Beijing (CN); Hongming Zhan, Beijing (CN); Xi Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/293,295

(22) PCT Filed: Feb. 14, 2023

(86) PCT No.: PCT/CN2023/075829
§ 371 (c)(1),
(2) Date: Jan. 29, 2024

(87) PCT Pub. No.: WO2024/168506
PCT Pub. Date: Aug. 22, 2024

(65) Prior Publication Data
US 2025/0093700 A1    Mar. 20, 2025

(51) Int. Cl.
G02F 1/1335     (2006.01)
G02F 1/1333     (2006.01)
G02F 1/1339     (2006.01)

(52) U.S. Cl.
CPC .. *G02F 1/133512* (2013.01); *G02F 1/133388* (2021.01); *G02F 1/133516* (2013.01); *G02F 1/13396* (2021.01)

(58) Field of Classification Search
CPC ......... G02F 1/133512; G02F 1/133388; G02F 1/13396
See application file for complete search history.

(56) References Cited

U.S. PATENT DOCUMENTS

2005/0275768 A1    12/2005    Tsubata et al.
2011/0299002 A1*   12/2011    Won .................. G02F 1/133512
                                                349/43

(Continued)

FOREIGN PATENT DOCUMENTS

CN    103149729 B    3/2016
CN    106526955 A    3/2017

(Continued)

*Primary Examiner* — Joseph L Williams
(74) *Attorney, Agent, or Firm* — BROOKS KUSHMAN P.C.

(57) ABSTRACT

A display panel, a method for manufacturing same, and a display device. The display panel comprises a first substrate and a second substrate, the first substrate comprises a first base substrate, a black matrix and a spacer, the second substrate comprises a second base substrate and a conductive layer, and the spacer comprises a display area spacer and a peripheral area spacer. The peripheral area comprises a first region and a second region, the number of conductive layers in the first region is less than the number of conductive layers in the second region, and the peripheral area spacer comprises a plurality of first peripheral area spacers provided in the first region. An insulating island is provided between the first peripheral area spacer and the black matrix, and a pattern of the insulating island comprises island patterns arranged at intervals to be isolated from each other.

20 Claims, 4 Drawing Sheets

(56) References Cited

U.S. PATENT DOCUMENTS

| | | |
|---|---|---|
| 2022/0004045 A1 | 1/2022 | Chen et al. |
| 2022/0206329 A1 | 6/2022 | Ma et al. |
| 2023/0359079 A1 | 11/2023 | Gao |

FOREIGN PATENT DOCUMENTS

| | | |
|---|---|---|
| CN | 105116628 B | 9/2018 |
| CN | 109917583 A | 6/2019 |
| CN | 209911730 U | 1/2020 |
| CN | 111258124 A | 6/2020 |
| CN | 111708228 A | 9/2020 |
| CN | 112596308 A | 4/2021 |
| CN | 112689790 A | 4/2021 |
| CN | 113138488 A | 7/2021 |
| CN | 214151324 U | 9/2021 |

* cited by examiner

DISPLAY PANEL, METHOD FOR MANUFACTURING SAME, AND DISPLAY DEVICE

CROSS-REFERENCE TO RELATED APPLICATION

This application is the U.S. national phase of PCT Application No. PCT/CN2023/075829 filed on Feb. 14, 2023, which is incorporated herein by reference in its entirety.

TECHNICAL FIELD

The present disclosure relates to the technical field of display, and more particularly, to a display substrate, a method for manufacturing the same, and a display device.

BACKGROUND

With the improvement of purchasing power, the performance requirements of the consumer to the displays are increasing, and the market demand for fast-response displays is increasing due to the rising electronic sports market. This type of display is using fast response liquid crystals, while matching low cell gap. However, as the cell gap decreases, the display becomes more sensitive to the fluctuation of the transmittance, which causes various image quality-related defects, such as white and black surrounding, and affects product shipment and market competitiveness. Therefore, the problem of image quality at low cell gap needs to be solved.

SUMMARY

Embodiments of the present disclosure provide a display panel, a method for manufacturing the same, and a display device capable of improving poor display and improving product quality.

The technical solutions provided by the embodiments of the present disclosure are as follows:

According to a first aspect of the present disclosure, there is provided a display panel, comprising a first substrate and a second substrate arranged in a cell, wherein the display panel has a display area and a peripheral area located at a periphery of the display area, and the display area comprises a plurality of sub-pixels arranged in an array; the first substrate comprises a first base substrate, and a black matrix and a spacer arranged on the first base substrate, and the second substrate comprises a second base substrate and a conductive layer arranged on the second base substrate; the black matrix defines a plurality of opening patterns corresponding to the plurality of sub-pixels, and the spacer comprises a display area spacer located in the display area and a peripheral area spacer located in the peripheral area; the peripheral area comprises a first region and a second region, the number of conductive layers of the second substrate in the first region is less than the number of conductive layers in the second region, and the peripheral area spacer comprises a plurality of first peripheral area spacers provided in the first region; the first peripheral area spacer is located on a side of the black matrix facing away from the first base substrate with an insulating island provided between the first peripheral area spacer and the black matrix, a pattern of the insulating island comprises a plurality of island patterns arranged at intervals to be isolated from each other, and each of the island patterns is correspondingly arranged between at least one of the first peripheral area spacers and the black matrix and coincides with an orthographic projection of the corresponding first peripheral area spacer on the first base substrate.

Illustratively, the first region comprises at least a partial region on the second substrate where only a single conductive layer is provided; the second region comprises a region on the second substrate where at least two conductive layers are provided.

Illustratively, the black matrix comprises a first light-shielding pattern located in the display area and a second light-shielding pattern located in the peripheral area, the first light-shielding pattern comprises a light-shielding pattern and the plurality of opening patterns, the second light-shielding pattern covers at least a partial area of the peripheral area on the whole, and a thickness of the first light-shielding pattern in a direction perpendicular to the first base substrate is less than a thickness of the second light-shielding pattern in the direction perpendicular to the first base substrate; wherein, the display area spacer is located on a side of the first light-shielding pattern facing away from the first base substrate, and the peripheral area spacer is located on a side of the second light-shielding pattern facing away from the first base substrate.

Illustratively, the spacer further comprises a display area spacer located in the display area, the display area spacer comprises a main spacer and an auxiliary spacer, the main spacer has a third height h3 in the direction perpendicular to the first base substrate, the auxiliary spacer has a fourth height h4 in the direction perpendicular to the first base substrate, and the third height h3 is greater than the fourth height h4.

Illustratively, the peripheral area spacer further comprises a plurality of second peripheral area spacers provided in the second region; wherein, the first peripheral area spacer has a first height h1 in the direction perpendicular to the first base substrate;

the second peripheral area spacer has a second height h2 in the direction perpendicular to the first base substrate, the second height h2 is greater than the first height h1, the second peripheral area spacer is of a same material as the main spacer, and the second height h2 is equal to the third height h3.

Illustratively, the first substrate further comprises a color film provided on the first base substrate, wherein the color film comprises a plurality of color filtering patterns located on the plurality of opening patterns, and the spacer is located on a side of the color film facing away from the first base substrate.

Illustratively, the plurality of sub-pixels comprise a first sub-pixel for displaying light of a first color, a second sub-pixel for displaying light of a second color and a third sub-pixel for displaying light of a third color, and the plurality of color filtering patterns comprise at least a first color filtering pattern corresponding to the first sub-pixel, a second color filtering pattern corresponding to the second sub-pixel and a third color filtering pattern corresponding to the third sub-pixel; wherein the insulating island is arranged in a same layer and made of a same material as one color filtering pattern of the plurality of color filtering patterns.

Illustratively, the auxiliary spacer is located on a side of the color film facing away from the first base substrate, and a film thickness of the island pattern in the direction perpendicular to the first base substrate is equal to a film thickness of the color film in the direction perpendicular to the first base substrate; the first peripheral area spacer is provided in a same layer and made of a same material as the auxiliary spacer, the first height h1 is less than a predetermined value of the fourth height h4, and the predetermined value is configured as: when a first material is deposited on the island pattern and a side surface of the color film facing away from the first base substrate, the first material flows out of the island pattern when being deposited so that there is a gap between the island pattern and a deposited film layer on the color film, the first material is a material of the first peripheral area spacer and the auxiliary spacer, and the predetermined value is equal to a numerical value of the gap.

Illustratively, the peripheral area comprises four sub-peripheral areas surrounding four peripheral sides of the display area, a width direction of each of the sub-peripheral areas is along a direction from an edge of the first base substrate to the display area, and a length direction is a direction perpendicular to the width direction;

in at least one of the sub-peripheral areas, at least one of the island patterns is strip-shaped and extends along the length direction of the sub-peripheral area where the island pattern is located, two adjacent island patterns which are strip-shaped are successively arranged at intervals along the width direction of the sub-peripheral area where the island patterns are located, and each of the island patterns which is strip-shaped is provided with a plurality of first peripheral area spacers which are successively arranged at intervals along a length direction of the island pattern on a side facing away from the first base substrate; and/or in at least one of the sub-peripheral areas, at least one of the island patterns is block-shaped, and a plurality of the island patterns are arranged in a matrix along a length direction and a width direction of the sub-peripheral area where the island patterns are located; and each of the island patterns which is block-shaped is provided with at least one of the first peripheral area spacers on a side facing away from the first base substrate.

Illustratively, in at least one of the sub-peripheral areas, a width of the strip-shaped island patterns is equal to a width of the sub-pixels in the width direction of the sub-peripheral area, a spacing between two adjacent strip-shaped island patterns in the width direction of the sub-peripheral area is equal to a pixel spacing of the plurality of sub-pixels in the width direction, and a distribution density of at least part of the first peripheral area spacers is equal to a pixel distribution density; and/or in at least one of the sub-peripheral areas, a size of the block-shaped island pattern is equal to a size of the sub-pixel, and a spacing between two adjacent block-shaped island patterns is equal to a pixel spacing of the plurality of sub-pixels, and a distribution density of at least part of the first peripheral area spacers is equal to a pixel distribution density.

Illustratively, the four sub-peripheral areas comprising: a binding area; an opposite side area opposite to the binding area; and a first side area and a second side area which are opposite to each other and located between the binding area and the opposite side area;

at least part of the patterns of the insulating islands in the binding area and the patterns of the insulating islands in the opposite side area are symmetrically arranged about a center of the display area;

at least part of the patterns of the insulating islands in the first side area and the patterns of the insulating islands in the second side area are symmetrically arranged about the center of the display area.

Illustratively, in the binding area, along a width direction extending from the first base substrate to the display area, the island patterns are sequentially arranged in N1 rows, and a row closest to the display area is a first row and a row farthest away from the display area is an N1-th row;

in the opposite side area, along a width direction extending from the first base substrate to the display area, the island patterns are sequentially arranged in N2 rows, and a row closest to the display area is a first row and a row farthest away from the display area is an N2-th row; wherein the first row of island patterns in the binding area have a first distance L1 from the display area; the first row of island patterns in the opposite side area have a second distance L2 from the display area; the first distance L1 is equal to the second distance L2.

Illustratively, N1 is greater than or equal to N2, and N2−N1=n, wherein the first to (N1-n)-th rows of island patterns in the binding area and the first to N2-th rows of island patterns in the opposite side area are symmetrically arranged about the center of the display area.

Illustratively, the peripheral area further comprises a third region, wherein the third region is a region where a sealant sealed with the second substrate is located; when n=1, in the binding area, the N1-th row of island patterns are located at a center position of the third region and the (N1-1)-th row of island patterns in the width direction of the binding area.

Illustratively, in the first side area, along a width direction extending from the first base substrate to the display area, the island patterns are sequentially arranged in N3 columns, and a row closest to the display area is a first row and a row farthest away from the display area is an N3 column;

in the second side area, along a width direction extending from the first base substrate to the display area, the island patterns are sequentially arranged in N4 columns, and a row closest to the display area is a first row and a row farthest away from the display area is an N4 column; wherein the first column of island patterns in the first side area have a third distance L3 from the display area; the first column of island patterns in the second side area have a fourth distance L4 from the display area; the first distance L1, the second distance L2, the third distance L3, and the fourth distance L4 are equal.

Illustratively, the second substrate is an array substrate comprising a gate electrode layer, a source and drain metal layer and an active layer provided on the second base substrate, wherein the array substrate is provided with only one of the gate electrode layer, the source and drain metal layer and the active layer in the first region.

According to a third aspect of the present disclosure, there is provided a method of manufacturing the display panel as described above, the method comprising the steps of:

a step of manufacturing a first substrate, specifically comprising:

providing a first base substrate;

fabricating a black matrix, an insulating island and a spacer on the first base substrate to form a first substrate, wherein the black matrix defines a plurality of opening patterns corresponding to the plurality of sub-pixels, the spacer is provided on a side of the color film facing away from the first base substrate, the spacer comprises a peripheral area spacer located in the peripheral area, the peripheral area spacer comprises a plurality of first peripheral area spacers, the first peripheral area spacer is located on a side of the black matrix facing away from the first base substrate with an insulating island provided between the first peripheral area spacer and the black matrix, a pattern of the insulating island comprises a plurality of island patterns arranged at intervals to be isolated from each other, and each of the island patterns is correspondingly arranged between at least one of the first peripheral area spacers and the black matrix and coincides with an orthographic projection of the corresponding first peripheral area spacer on the first base substrate;

a step of manufacturing a second substrate, specifically comprising:

providing a second base substrate;

forming a conductive layer on the second base substrate, wherein the peripheral area comprises a first region and a second region, the number of conductive layers of the second substrate in the first region is less than the number of conductive layers in the second region, and a plurality of the first peripheral area spacers are provided in the first region.

Illustratively, in the method, the manufacturing a black matrix, an insulating island and a spacer on the first base substrate specifically comprises:

fabricating a black matrix on the first base substrate, wherein the black matrix comprises a first light-shielding pattern located in the display area and a second light-shielding pattern located in the peripheral area, the first light-shielding pattern comprises a light-shielding pattern and the plurality of opening patterns, the second light-shielding pattern covers at least a partial area of the peripheral area on the whole;

fabricating a color film and an insulating island on the first base substrate, wherein a film thickness of the color film and the insulating island in a direction perpendicular to the substrate is equal;

fabricating a spacer on the first base substrate, wherein the spacer comprises a display area spacer and a peripheral area spacer, the display area spacer comprises a main spacer and an auxiliary spacer, the peripheral area spacer further comprises a plurality of second peripheral area spacers provided in the second region, the second region is a region on the second substrate where at least two conductive layers are provided in the peripheral area, and the auxiliary spacer is located on a side of the color film facing away from the first base substrate.

Illustratively, in the method, the manufacturing a color film and an insulating island on the first base substrate specifically comprises: forming the island patterns of the insulating island and one of the plurality of color filtering patterns in a same patterning process.

Illustratively, in the method, the manufacturing a spacer on the first base substrate specifically comprises:

forming the display area spacer and the peripheral area spacer in a same patterning process.

Illustratively, the forming the display area spacer and the peripheral area spacer in a same patterning process specifically comprises:

depositing a first material on the whole surface of the first base substrate formed with the island pattern and the color film, wherein the first material is a material of the spacer, wherein when the first material is deposited, part of the material flows out of the island pattern, so that there is a gap between the island pattern and a deposited film layer on the color film;

patterning the deposited film layer by means of a semi-gray scale mask to form the main spacer and the auxiliary spacer of the display area spacer, and the first peripheral area spacer and the second peripheral area spacer of the peripheral area spacer.

The embodiments of the present disclosure have the following beneficial effects.

The display panel and the method for manufacturing the same, and the display device provided by an embodiment of the present disclosure can achieve fine adjustment of a support height of a first peripheral area spacer by improving spacers in a peripheral area, providing a first peripheral area spacer in a first region where only a single conductive layer is provided on a second substrate, providing an island pattern between a black matrix and the first peripheral area spacer, wherein a plurality of the island patterns are spaced apart from each other and isolated from each other, such that when the first peripheral area spacer is deposited, a deposition material thereof can flow to grooves on both sides of the island pattern, so as to reduce the support height of the first peripheral area spacer; it can achieve the purpose of being as close as possible to the supporting condition of the display area, so as to reduce the poor picture and improve the product quality.

DETAILED DESCRIPTION

Figure 1:
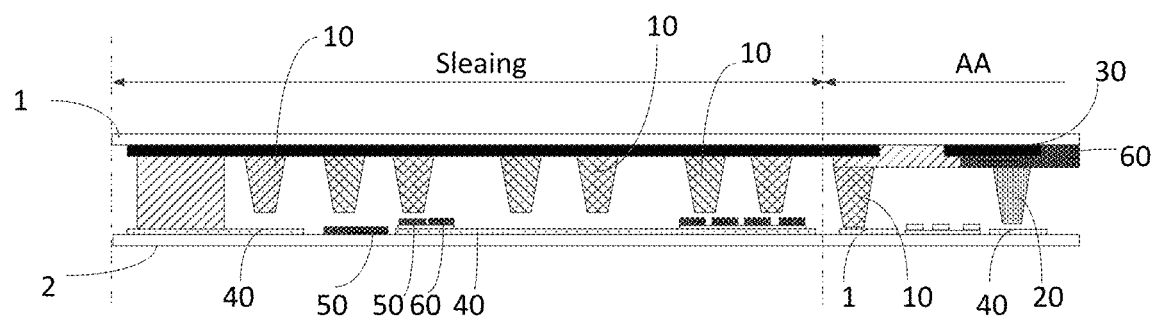
FIG. 1 is a schematic diagram showing a spacer structure of a peripheral area and a display area on a first substrate in the related art.

In order that the objects, technical solutions and advantages of the embodiments of the present disclosure will become more apparent, a more particular description of the embodiments of the present disclosure will be rendered by reference to the appended drawings. It is to be understood that the described embodiments are part, but not all, of the disclosed embodiments. Based on the embodiments described in the present disclosure, all other embodiments obtained by a person of ordinary skill in the art without inventive effort fall within the scope of the present disclosure.

Unless defined otherwise, technical or scientific terms used in this disclosure shall have the ordinary meaning as understood by one of ordinary skill in the art to which this disclosure belongs. The terms "first", "second", and the like as use herein do not denote any order, quantity, or importance, but rather are used to distinguish one element from another. Likewise, terms such as "a", "an", or "the" do not denote a limitation of quantity, but rather denote the presence of at least one of the referenced items. The terms "comprising" or "comprises", and the like, means that the presence of an element or item preceding the word covers the presence of the element or item listed after the word and equivalents thereof, but does not exclude other elements or items. The terms "connecting" or "connected" and the like are not limited to physical or mechanical connections, but may include electrical connections, whether direct or indirect. The terms "upper", "lower", "left", "right" and the like are used only to indicate relative positional relationships that may change accordingly when the absolute position of the object being described changes.

In the present disclosure, two structures "disposed in the same layer" means that the two are formed from the same material layer, so that they are in the same layer in a stacked relationship, but do not mean that they are equidistant from the substrate, nor that they are identical to the other layer structures between the substrate.

In the present disclosure, a "patterning process" refers to a step of forming a structure having a specific pattern, which may be a photolithography process comprising one or more of the steps of forming a material layer, coating a photoresist, exposing, developing, etching, photoresist stripping, etc.; of course, the "patterning process" may also be other processes such as an imprinting process, an inkjet printing process, etc.

The present disclosure will be described in more detail below with reference to the accompanying drawings. Like elements in the various figures are denoted by like reference numerals. For clarity, various parts of the drawings are not drawn to scale. Furthermore, some well-known parts may not be shown in the figures.

Numerous specific details of the present disclosure are set forth below, such as structure of components, materials, dimensions, processing techniques and techniques, in order to provide a more clear understanding of the present disclosure. However, it will be understood by those skilled in the art that the present disclosure may be practiced without these specific details.

Before describing in detail the display panel, the method for manufacturing the same, and the display device provided by the embodiments of the present disclosure, it is necessary to describe the related art as follows:

In the related art, there has been an increasing demand for fast response display products, such as competitive displays. Such display products are typically of low cell gap design (e.g., the cell gap is 2.0 µm), making themselves susceptible to variations in cell gap, resulting in poor peripheral display. For example, the non-rapid response shows that the cell gap of the product is about 3.3 µm, while the rapid response shows that the cell gap of the product is about 2.0 µm, and the fluctuation of the cell gap is ±0.1 µm. The non-rapid response shows that the effect of the fluctuation of the cell gap on the transmittance is only about 5%, while the rapid response shows that the effect of the fluctuation of the cell gap on the transmittance is more than 10%, especially at the middle and low gray levels. Such fluctuations in the transmittance due to fluctuations in the cell gap can result in various peripheral defects of the display, such as lightening, blackening, etc. Therefore, how to improve the uniformity and stability of cell gap of low cell gap display products is an urgent problem to be solved.

The design of the low cell gap display product in terms of cell gap support is as follows:

In a display area (AA area), a dual spacer (Dual PS) design is used, namely, a main spacer (Main PS) 10 and an auxiliary spacer (Sub PS) 20, wherein the main spacer 10 and the auxiliary spacer 20 are located at a light-shielding pattern of a black matrix 30 of a color film substrate 1, the black matrix 30 is in a grid shape in the display area, the opposite side environment where the spacers of the display area are located is a single-layer gate metal layer (that is to say, only a single-layer gate metal layer is provided at the support position of the spacers on the array substrate, for example, a gate line layer 40 shown in FIG. 1), and the height gap of the main spacer 10 and the auxiliary spacer 20 is between 0.5-0.6 microns; in a peripheral area (a sealing area), an auxiliary spacer 20 is used to support same in a region corresponding to a virtual sub-pixel (Dummy RGB), and a main spacer 10 design is used in the remaining region; there is no special rule for the environment at the opposite side of the spacer in the peripheral area; and according to the design of the array substrate, the environment at the opposite side of the spacer in the peripheral area is different, which may be a single-layer gate metal layer, a double-layer metal layer or a three-layer metal (that is to say, the support position of the spacer on the array substrate may correspond to the single-layer gate metal layer, the double-layer metal layer or the three-layer metal, for example, the gate electrode layer 40, the source and drain metal layer 50 and the active layer 60 shown in FIG. 1).

Taking a related art display panel shown in FIG. 1 as an example, a spacer of a display area is located in a light-shielding pattern area of a grid-shaped black matrix 30 on a color film substrate, the spacer is located on the color film 60, and the opposite side of the spacer is a single-layer gate metal layer. The press-in amount of the main spacer 10 is 0.28 µm, and since the height gap between the main spacer 10 and the auxiliary spacer 20 is 0.5 µm, the distance of the auxiliary spacer 20 from the opposite array substrate is about 0.22 µm, and does not contact the opposite array substrate in a natural state (no external force).

The inventors of the present disclosure have found that a difference in the environment of the spacer on the opposite sides of the peripheral area and the display area causes a problem in uniformity of the cell gap, resulting in poor display. Therefore, if it is desired to solve the problem of uneven cell gap in the display area in the peripheral area, the spacer support heights of the display area and the peripheral area should be made as close or the same as possible. Since the environment at the opposite side of the spacer of the display area on the color film substrate is a single gate metal layer, and the spacer is deposited on the color film, and thus the supporting structure of the auxiliary spacer 20 of the display area is a black matrix 30, and the color film 60 and the spacer are stacked successively, then, in order to make the support heights of the spacers of the display area and the peripheral area as identical as possible, it can be considered to provide a virtual color film in the region where the environment at the opposite side of the peripheral area is a single gate metal layer, and then deposit the auxiliary spacer 20 on the virtual color film.

However, the inventors of the present disclosure have studied and found that since the black matrix 30 of the peripheral area has a monolithic shape and the black matrix 30 of the display area has a grid shape, the two patterns are different, resulting in a difference in the height of the deposited material when manufacturing the black matrix 30, that is, the thickness of the finally obtained black matrix 30 pattern of the display area is slightly different from the thickness of the black matrix 30 pattern of the display area, and the thickness of the black matrix 30 pattern of the peripheral area is slightly greater than the thickness of the black matrix 30 pattern of the display area. Therefore, when the area of the single-layer gate metal layer corresponding to the array substrate is also provided with a virtual color film, and when the auxiliary spacer 20 is provided on the virtual color film, it will certainly result in that the auxiliary spacer 20 finally deposited on the peripheral area will be higher than the auxiliary spacer 20 on the display area, and the farther away from the display area, the greater the difference in height between the auxiliary spacer 20 on the display area and the auxiliary spacer 20 on the peripheral area. The environment is irregular on the side of the spacer in the peripheral area (namely, it may be a single-layer, a double-layer or a three-layer metal); if the same spacer structure is placed on the peripheral area and the display area, namely, the black matrix 30, and the auxiliary spacer 20 is further arranged on the virtual color film, then the support strength of the peripheral area will certainly be stronger than that of the display area, and the peripheral yellowing will bad. However, in order to reduce the height difference between the auxiliary spacer 20 in the display area and the auxiliary spacer 20 in the peripheral area, if the support height of the auxiliary spacer 20 is reduced, firstly, the mask plate needs to be redesigned, and the cost will increase; second, since the thickness difference between the black matrix 30 of the display area and the black matrix 30 of the peripheral area is small, the current spacer deposition process cannot accurately compensate for the difference. Therefore, in order to avoid excessive support of the peripheral area, as shown in FIG. 1, it is also possible to directly place the main spacer 10 on the black matrix 30 at the peripheral area. However, if the main spacer 10 is directly placed on the black matrix 30 in the peripheral area, the support of the color film will be absent, which will make the overall support strength of the peripheral area weaker than that of the display area. Under the effect of vacuum on the box or external force, the seesaw effect will be induced, which will cause the cell gap at the edge of the display area to be higher than that in the central area, and different cell gapes will cause different transmission rates, thus causing the peripheral brightening. Such cell gap uniformity problems have little effect on the transmission on non-fast response display products and may not be apparent, however, on low cell gap display products, the transmission effect is magnified, producing a visually observable effect that may result in poor surrounding visuals.

Based on the above analysis, in order to solve the problem of uneven cell gap between the peripheral area and the display area, it is necessary to ensure that the supporting structures of the peripheral area and the display area are as identical as possible, so as to minimize the change in cell gap caused by the action of vacuum on the box or external force, and ensure the uniformity and stability of cell gap, which is the key to solve the poor picture of low cell gap display products.

Embodiments of the present disclosure provide a display panel, a method for manufacturing the same, and a display device, which provide a spacer design optimization scheme in a peripheral area, and can improve uniformity of the cell gap of the display panel, thereby improving product quality and improving a poor picture.

Figure 2:
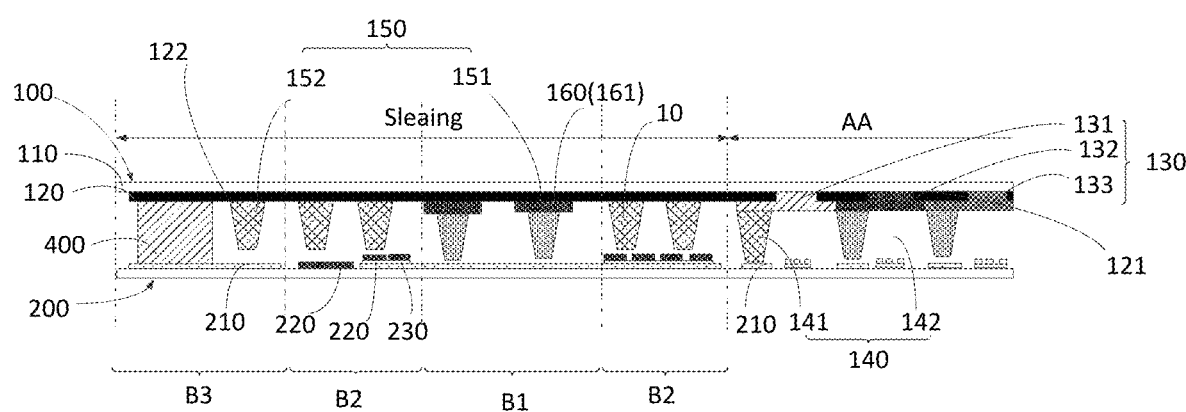
FIG. 2 is a schematic diagram showing a partial structure of a cell pair of a first substrate and a second substrate in the embodiment of the present disclosure.

As shown in FIG. 2, an embodiment of the present disclosure provides a display panel, comprising a first substrate 100 and a second substrate 200 arranged in a cell, wherein the display panel comprises a display area (AA area) and a peripheral area (Sleaing) located at the periphery of the display area, and the display area comprises a plurality of sub-pixels arranged in an array; the first substrate 100 comprises a first base substrate 110 and a black matrix 120 arranged on the first base substrate 110, the second substrate 200 comprises a second base substrate 210 and multiple conductive layers arranged on the second base substrate 210, and the black matrix 120 defines multiple opening patterns corresponding to the multiple sub-pixels; the first substrate 100 further comprises: a spacer, the spacer comprising a display area spacer 140 located at a display area and a peripheral area spacer 150 located at the peripheral area; the peripheral area comprises a first region B1 and a second region B2, the number of conductive layers of the second substrate 200 in the first region B1 is less than the number of conductive layers of the second region B2, and the peripheral area spacer 150 comprises a plurality of first peripheral area spacers 151 provided on the first region B1; the first peripheral area spacer 151 is located on a side of the black matrix 120 facing away from the first base substrate 110 and is provided with an insulating island 160 between the black matrix 120, the pattern of the insulating island 160 comprises a plurality of island patterns 161 which are arranged at intervals to be isolated from each other, and each of the island patterns 161 is correspondingly arranged between at least one of the first peripheral area spacers 151 and the black matrix 120 and coincides with an orthographic projection of the corresponding first peripheral area spacer 151 on the first base substrate 110.

In the above aspect, by modifying the spacers in the peripheral area, the first peripheral area spacer 151 in the first region B1 having less conductive layer is provided in the second substrate 200, and the island pattern 161 is designed between the black matrix 120 and the first peripheral area spacer 151. The process for manufacturing a spacer can be: first depositing a first material on the whole surface, and then performing a patterning process on the deposited film layer after the first material is deposited to obtain a spacer pattern. Since a plurality of the island patterns 161 are configured to be spaced apart from each other and isolated from each other, a trench can be formed between the plurality of island patterns 161, so that when a first peripheral area spacer 151 is deposited on the island patterns 161, the deposition material of the first peripheral area spacer 151 can flow to the trench on both sides of the island patterns 161, so that the support height after the support height of the first peripheral area spacer 151 is superimposed on the island patterns 161 can be slightly lower than a design value in a deposition process, thereby achieving the purpose of fine-tuning a first peripheral area spacer region of a peripheral area, in order to reduce the support height of the first peripheral area spacer 151, in this way, the spacer support structure provided in the first region B1 with a small number of conductive layers in the environment opposite the spacer can be a black matrix 120, the island pattern 161 and the first peripheral area spacer 151 are supported in superposition, and the film thickness of the island pattern 161 can be adjusted according to the support structure on the auxiliary spacer area in the display area in the actual product, so as to achieve the purpose of being as close as possible to the support condition of the display area, thereby reducing poor pictures and improving product quality.

In some exemplary embodiments, the first region B1 includes at least a partial region on the second substrate 200 where only a single conductive layer is disposed; the second region B2 includes a region where at least two conductive layers are disposed on the second substrate.

In some exemplary embodiments, as shown in FIG. 2, the black matrix 120 includes a first light-shielding pattern 121 located in the display area and a second light-shielding pattern 122 located in the peripheral area, the first light-shielding pattern 121 includes a light-shielding pattern and the plurality of opening patterns, that is, the black matrix 120 of the display area may have a substantially lattice shape. The second light-shielding pattern 122 is a light-shielding pattern covering at least part of the area of the peripheral area on the whole, that is to say, the black matrix 120 of the peripheral area is substantially in the shape of a whole block, the display area spacer is located on the side of the first light-shielding pattern 121 facing away from the first base substrate 110, and the peripheral area spacer is located on the side of the second light-shielding pattern 122 facing away from the first base substrate 110.

In this way, when the black matrix 120 is manufactured, the film thickness of the black matrix 120 in the peripheral area is different from that in the display area, the film thickness of the black matrix 120 in the peripheral area is slightly greater than the film thickness of the black matrix 120 in the display area, that is, the thickness of the first light-shielding pattern 121 in the direction perpendicular to the first base substrate 110 is less than the thickness of the second light-shielding pattern 122 in the direction perpendicular to the first base substrate 110. The support height of the first peripheral area spacer 151 combined with the above peripheral area is lower than the design value, so that the stacked support height of the black matrix 120 of the peripheral area after stacking the island pattern 161 and the first peripheral area spacer 151 can be the same as the display area as much as possible.

In some embodiments, the spacer further comprises a display area spacer 140 located at the display area, the display area spacer 140 comprising a main spacer 141 having a third height h3 in a direction perpendicular to the first base substrate 110 and an auxiliary spacer 142 having a fourth height h4 in a direction perpendicular to the first base substrate 110, the third height h3 being greater than the fourth height h4.

In the above-mentioned solution, as shown in the figure, there will be a height difference between the top end of the main spacer 141 (namely, the end away from the first base substrate 110) and the top end of the auxiliary spacer 142 (namely, the end away from the first base substrate 110); the main spacer 141 is used for supporting the cell gap in a natural state (a non-compression deformation state); and when the deformation amount of the liquid crystal cell reaches a certain amount under the action of an external force, etc. the top end of the auxiliary spacer 142 will contact the array substrate on the opposite side of the first substrate 100 to support the cell gap.

Wherein, as shown in FIG. 2, the opposite side environment of at least part of the main spacer 141 and at least part of the auxiliary spacer 142 is a single conductive layer platform (namely, support position on the array substrate is a single conductive layer region), for example, the single conductive layer can be a gate electrode layer 210 on the array substrate.

Furthermore, by way of example, the first substrate 100 may be a color film substrate, which further comprises a color film 130 provided on the first base substrate 110, the color film 130 comprising a plurality of color filtering patterns located on the plurality of opening patterns, and the spacer being located on a side of the color film 130 facing away from the first base substrate 110.

the peripheral area spacer 150 further comprises a plurality of second peripheral area spacers 152 provided in the second region B2, and the first peripheral area spacer 151 has a first height h1 in a direction perpendicular to the first base substrate 110; the second peripheral area spacer 152 has a second height h2 in a direction perpendicular to the first base substrate 110, the second height h2 is greater than the first height h1, the second peripheral area spacer 152 is the same material as the main spacer 141, and the second height h2 is equal to the third height h3.

In the above-mentioned solution, the peripheral area not only comprises a first region B1 provided with only a single conductive layer, but also a second region B2 provided with at least two conductive layers, for example, a two-layer conductive layer (such as a source and drain metal layer 220 and a gate electrode layer 210 overlapping) or a three-layer conductive layer (such as a source and drain metal layer 220, a gate electrode layer 210 and an active layer 230). With regard to the second region B2, if it is the same as the display area as much as possible, no matter the overlapping structure of the color film and the auxiliary spacer 142 is provided, or the overlapping structure of the color film and the main spacer 141 is provided, since the thickness of at least two conductive layers in the environment opposite the peripheral area spacer 150 is greater than that of a single conductive layer in the environment opposite the display area spacer 140, the final support height of the spacer in the peripheral area will certainly be greater than that of the display area; therefore, in combination with the manufacturing process factors of the spacer, for example, saving mask costs, the color film may not be provided in the second region B2. A second peripheral area spacer 152 of the same material and the same layer as the main spacer 141 of the display area is directly provided on the black matrix 120, so as to minimize the support difference between the peripheral area and the display area spacer 140.

Further, in some exemplary embodiments, the plurality of sub-pixels includes a first sub-pixel for displaying light of a first color, a second sub-pixel for displaying light of a second color, and a third sub-pixel for displaying light of a third color, and the plurality of color filtering patterns includes at least a first color filtering pattern 131 corresponding to the first sub-pixel, a second color filtering pattern 132 corresponding to the second sub-pixel, and a third color filtering pattern 133 corresponding to the third sub-pixel. As shown in the figure, the first, second and third color filtering patterns 133 are respectively at least partially filled into corresponding opening patterns, and at least partially protrude from the side of the first light-shielding pattern 121 of the black matrix 120 facing away from the first base substrate 110, and the display area spacer 140 is deposited and formed on the side of the color film facing away from the first base substrate 110.

In some embodiments, the insulating island 160 is disposed in the same layer and in the same material as one of the plurality of color filtering patterns. In this way, the thickness of the insulating island 160 and the film layer of one color filtering pattern can be substantially the same, and can be formed using the same patterning process, so as to ensure that the first region B1 and the supporting structure of the display area are the same as possible.

Illustratively, the insulating island 160 may be the same layer and material as the first color filtering pattern 131. The first color filtering pattern 131 may be a blue color filtering pattern. Of course, it is to be understood that the insulating island 160 is not limited to the same material as the color film, and other insulating materials such as resin and the like may be used.

For example, the auxiliary spacer 142 is located on a side of the color film 130 facing away from the first base substrate 110, and the film thickness of the island pattern 161 in the direction perpendicular to the first base substrate is equal to the film thickness of the color film in the direction perpendicular to the first base substrate 110; the first peripheral area spacer 151 and the auxiliary spacer 142 are arranged on the same layer and the same material, the first height h1 is less than the predetermined value of the fourth height h4, and the predetermined value is configured to: when a first material is deposited on the surface of the island pattern 161 and the side of the color film 130 facing away from the first base substrate 110, the first material flows out of the island pattern 161 when it is deposited, so that there is a gap between the island pattern 161 and the deposited film layer on the color film 130, the first material is the material of the first peripheral area spacer 151 and the auxiliary spacer 142, and the predetermined value is equal to the value of the gap.

With the above-mentioned solution, the auxiliary spacer 142 can be deposited on a side of the color film facing away from the first base substrate 110, and the supporting structure thereof is: the auxiliary spacer 142, the color film and the black matrix 120 are stacked and supported; and the second peripheral area spacer 152 can be deposited on the side of the pattern facing away from the first base substrate 110, and the supporting structure thereof is: the second peripheral area spacer 152, the island pattern 161 and the black matrix 120 are supported in a stacked manner, and the environments opposite the top ends of the auxiliary spacer 142 and the second peripheral area spacer 152 are all single-layer conductive layer platforms, that is to say, the second substrate 200 corresponds to an area where a single-layer conductive layer is located. Therefore, the spacer support structure of the first region B1 and the display area can be ensured to be as identical as possible, and since the black matrix 120 is block-shaped in the peripheral area and in a lattice shape in the display area, the film thickness of the black matrix 120 in the peripheral area will be slightly greater than the film thickness of the display area due to the manufacturing process of the black matrix 120; and since the plurality of island patterns 161 are patterns spaced apart from each other and isolated from each other, the first peripheral area spacer 151 and the auxiliary spacer 142 can be formed by the same patterning process when manufacturing same, wherein in the deposition process, a deposition material (namely, a first material) flows on the island patterns 161 into a groove outside the island patterns 161, while in the color film, since the area of the color film is greater than that of the island patterns 161, the deposition material does not flow outside the color film, so that the height of the second peripheral area spacer 152 intersecting the auxiliary peripheral area spacer is lower. In addition, the height difference is generated due to the flow of the deposition material, and can reach an accuracy which cannot be achieved by the patterning process, so as to compensate for the film thickness difference between the peripheral area and the display area of the black matrix 120, so that the spacer support structure of the first region B1 is as identical as possible to the display area, so as to improve the cell gap uniformity problem and improve the poor picture phenomenon.

It should be noted here that the object of the above-mentioned arrangement is to reduce the height of the second peripheral area spacer 152 crossing the height of the auxiliary spacer 142 by depositing material into the channel flow path outside the island pattern 161, and since this height difference needs to be compensated for by a small value, if the mask plate is used for the patterning process to reduce this height difference, on the one hand, the cost is increased, and on the other hand, the accuracy is not easy to achieve.

Figure 3:
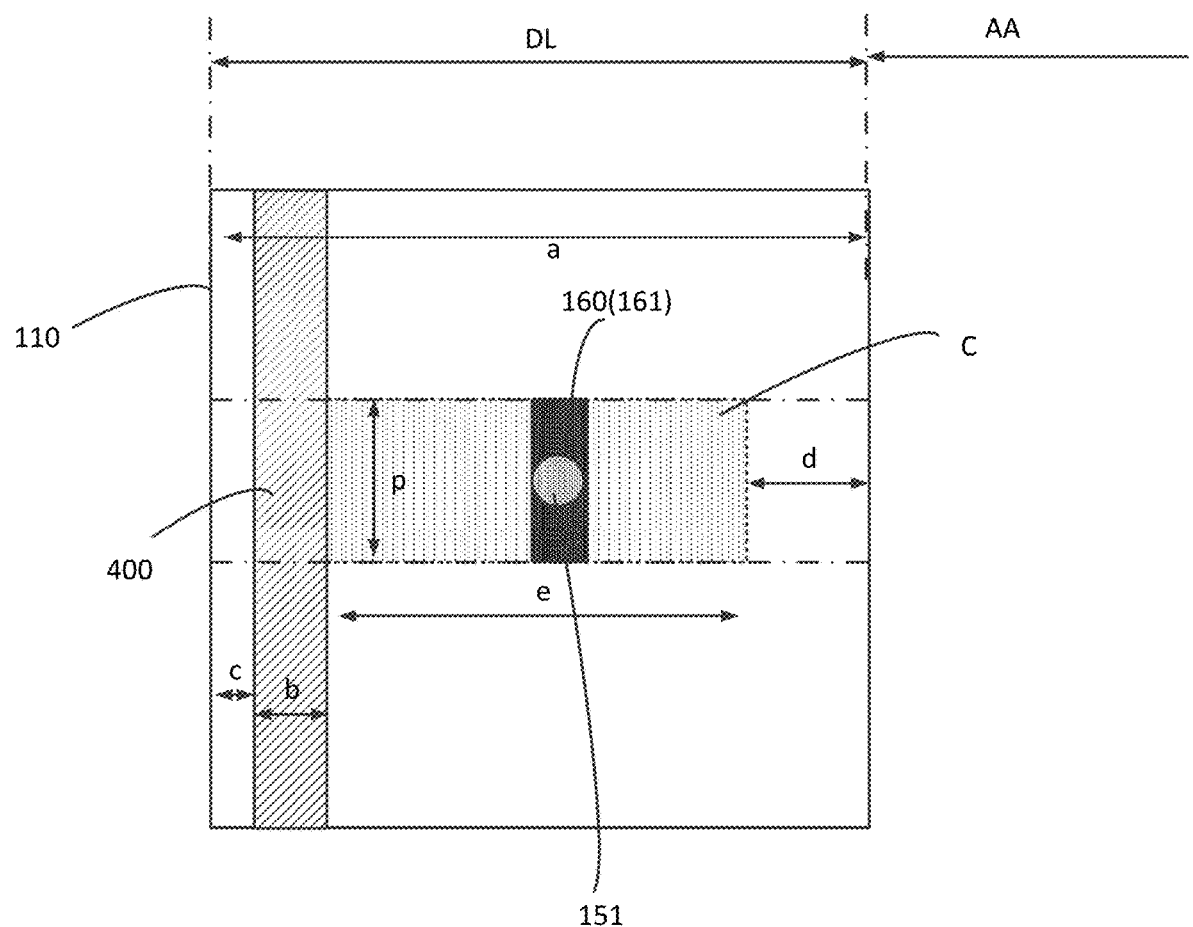
FIG. 3 a schematic diagram for calculating the number of rows/columns of the island patterns arranged in the sub-peripheral area of the first substrate in the embodiment of the present disclosure.

As shown in FIG. 3, the peripheral area includes four sub-peripheral areas surrounding the peripheral side of the display area, each of the sub-peripheral areas has a width direction along a direction from an edge of the first base substrate 110 to the display area and a length direction perpendicular to the width direction. The four sub-peripheral areas may comprise: a binding area DP; an opposite side area DO opposite to the binding area; and a first side area DL and a second side area DR which are located between the binding area and the opposite side area and are opposite to each other.

Illustratively, in at least one of the sub-peripheral areas, at least one of the island patterns 161 is strip-shaped and extends along the length direction of the sub-peripheral area where the island pattern 161 is located, two adjacent strip-shaped island patterns 161 are successively spaced apart along the width direction of the sub-peripheral area where the island pattern 161 is located, and each of the island patterns 161 which is strip-shaped is provided with a plurality of first peripheral area spacers 151 which are successively arranged at intervals along a length direction of the island pattern on a side facing away from the first base substrate 110. The width of the strip-shaped island patterns 161 is equal to the width of the sub-pixel in the width direction of the sub-peripheral area, the spacing between two adjacent strip-shaped island patterns 161 in the width direction of the sub-peripheral area is equal to the pixel spacing of the plurality of sub-pixels in the width direction, and the distribution density of at least part of the first peripheral area spacer 151 is equal to the pixel distribution density. That is, in at least one sub-peripheral area, the island patterns 161 may be strip-shaped, and the width of the island patterns 161 in the strip-shape is the pixel width, the spacing between the island patterns 161 is the pixel spacing, and the distribution density of the first peripheral area spacers 151 arranged on the island patterns 161 is the pixel density. This arrangement makes it possible to have the same distribution of the auxiliary spacers 142 as the display area.

Further, by way of example, in at least one of the sub-peripheral areas, at least one of the island patterns 161 is block-shaped, and a plurality of the island patterns 161 are arranged in a matrix along a length direction and a width direction of the sub-peripheral area where the island patterns 161 are located, and each of the island patterns 161 in the block shape is provided with at least one of the first peripheral area spacers 151 on a side facing away from the first base substrate 110. The size of the island pattern 161 in a block shape is equal to a size of the sub-pixel, a pitch between two adjacent island patterns 161 in a block shape is equal to a pixel pitch of the plurality of sub-pixels, and a distribution density of at least part of the first peripheral area spacer 151 is equal to a pixel distribution density. That is, in at least one sub-peripheral area, the island patterns 161 may be block-shaped, and the width of the block-shaped island patterns 161 is the pixel width, the pitch between the island patterns 161 is the pixel pitch, and the distribution density of the first peripheral area spacers 151 arranged on the island patterns 161 is the pixel density. This arrangement makes it possible to have the same distribution of the auxiliary spacers 142 as the display area.

It should be noted that in the four sub-peripheral areas, a strip-shaped island pattern 161 may be provided in all the four sub-peripheral areas, or a block-shaped island pattern 161 may be provided in all the four sub-peripheral areas; it is also possible that at least one sub-peripheral area is provided with a stripe-shaped island pattern 161 and at least another sub-peripheral area is provided with a block-shaped island pattern 161. The shape and arrangement of the island patterns 161 can be rationally selected according to the actual situation of the display product.

It that the first substrate 100 may further include an alignment layer (PI) for aligning liquid crystal. The alignment layer is made by covering the black matrix 120 and the color film with the PI liquid on the whole surface, and when the width of the peripheral area is narrow, in order not to affect the flow of the PI liquid, the island pattern 161 may be selected as a block pattern, or the island pattern 161 may also be a strip pattern but may be divided into several sections at intervals in the extension direction, so as to avoid poor peripheral display caused by PI diffusion.

In addition, in an exemplary embodiment, taking the case where the second substrate 200 on the opposite side of the first substrate 100 is provided with a GOA circuit in a peripheral area, the peripheral area can be divided into a first region B1, a second region B2 and a third region B3, wherein the third region B3 is the region where the sealant 400 is located, the region where the GOA circuit is located is the second region B2, and a gate electrode layer 210 (Gate), a source and drain metal layer 220 (SD) and an active layer (Active) 230 are provided as three conductive layers; the three conductive layers increase the thickness of the second substrate 200 compared to the first region B1. Therefore, in order to avoid excessive support, the second region B2 completely avoids the placement of the island pattern 161 and the first peripheral area spacer 151, and only places the second peripheral area spacer 152 with the same material and the same height as the main spacer 141, so that the second peripheral area spacer 152 does not contact the second substrate 200 and does not cause excessive support. The gate electrode layer 210 or the source and drain metal layer 220 is mostly a single layer of metal in the first region B1; therefore, the island pattern 161 and the first peripheral area spacer 151 can be placed in the first region B1, and the distribution density of the first peripheral area spacer 151 is the pixel density.

Note that when the island patterns 161 are arranged at pixel pitch intervals, if a part of the bi-layer or tri-layer conductive layer is encountered, the interval of the island patterns 161 may be appropriately increased or decreased to avoid the bi-layer or tri-layer conductive layer so as to avoid excessive support. In addition, the number of rows and columns of the island patterns 161 and the first peripheral area spacers 151 arranged on the first region B1 can be calculated according to the condition of the peripheral area of an actual product.

How to calculate the number of rows/columns of the island patterns 161 and the first peripheral area spacers 151 arranged on the first region B1 according to the peripheral area condition of an actual product is as follows:

TABLE 1

Number of rows/columns of the island patterns that can be arranged in the display area at force balance in one embodiment

| Display area | | Remarks |
|---|---|---|
| Top end area of main spacer | 94.985 | If the amount |
| Arrangement density of main spacer | 0.037037037 | of compression |
| Top end area of auxiliary spacer | 204 | is positive, |
| Pixel pitch | 103.6 | it indicates |
| Relative contact area of main spacer | 109 | uncompression |
| Amount of compression of main spacer | 0.407 | |
| Height gap of main spacer and auxiliary spacer | 0.53 | |
| Thickness gap of film layer of conductive layer on substrate on opposite side of display area and peripheral area | −0.13 | |
| Amount of compression of peripheral area spacer | −0.007 | |
| | −0.057 | Consider PSH fluctuations |

TABLE 2

Number of rows/columns of the island patterns that can be arranged in the peripheral area at force balance in one embodiment

| | Peripheral area | | | |
|---|---|---|---|---|
| | DR/ DL side | DO side | DP side | Remarks |
| Number of island patterns | 6 | 6 | 6 | |
| Width of peripheral area | 5.5 | 5.5 | 6.2 | |
| Width of sealant | 1.1 | 1.1 | 1.1 | |
| Distance from sealant to edge of transparent substrate | 0.25 | 0.25 | 0.25 | |
| Area of first region | 1.09663 | 1.09663 | 1.31419 | |
| Number of rows/columns of first peripheral area spacer | 1 | 1 | 1 | Place alone |
| Density of spacers within the row/column | 0.3333 | 0.3333 | 0.3333 | ⅓ represents the pixel pitch |
| Relative contact area of peripheral area spacer | 186.025 | 186.025 | 155.229 | |

By listing the data in Table 1, the amount of compression of the first peripheral area spacer 151 on the island pattern 161 at the limit cell gap fluctuation can be calculated. If the amount of compression of the first peripheral area spacer 151 is a positive value, it represents that the first peripheral area spacer 151 does not contact the second substrate 200; at this time, the number of rows of the arrangement of the island patterns 161 can be arranged according to the maximum width of the first region B1; the position of the initial end of the arrangement is outside the second region B2; the position of the end of the arrangement is a third region B3 where the sealant 400 does not overlap under process fluctuations; and the spacing distance between the position of the island patterns 161 and the third region B3 can be the sum of the width accuracy and the position accuracy of the sealant. If the amount of compression of the first peripheral area spacer 151 is a negative value, it represents that the first peripheral area spacer 151 will have a certain amount of compression at this time, and therefore the number of columns of the first peripheral area spacer 151 at this time is limited and can be calculated from Table 2. Taking one sub-peripheral area as an example (e.g., the first side area GL), the following widths refer to widths in the width direction of the sub-peripheral area. The arrangement rule of the island patterns 161 is:

Firstly, calculating the total width of the arrangeable island patterns 161, namely, the width of e in FIG. 3, e=a−b−c−d; in the formula, a is the width of the peripheral area, b is the width of the sealant, c is the distance from the sealant to the edge of the first base substrate 110 (namely, b+c is equal to the width of the third region B3), and d is the width of the island patterns 161.

Then, selecting a pixel width (one pixel is correspondingly placed with a second peripheral area spacer 152, and therefore there is only one second peripheral area spacer 152 in each column under the pixel width), and calculating the area of the area C as shown in FIG. 3, so as to obtain the total area of the placement island pattern 161=e*p, wherein p is a pixel interval.

Then, the column number of the island patterns 161 n=S1*Δh1/(S2*1/S3*Δh2) is calculated by the following formula, wherein S1 is the contact area of the main spacer 141 of the display area, Δh1 is the press-in amount of the main spacer 141, S2 is the contact area of the second peripheral area spacer 152, S3 is the total area of the first region B1 of the distributable island patterns 161, and Δh2 is the limit compression amount of the second peripheral area spacer 152.

Taking a second substrate 200 shown in FIG. 2 as an example, in the direction extending from the display area to the edge of the first base substrate 110, the sub-peripheral areas may be: a second region B2, a first region B1, a second region B2 and a third region B3; therefore, when arranging, after calculating the number of columns of the arrangeable island patterns 161 above, the arrangement principle of the island patterns 161 is to sequentially arrange the island patterns 161 from a second region B2 close to the display area and from the position closest to the second region B2, along the direction extending to the edge of the first base substrate 110, the arrangement density of the island patterns 161 being the pixel distribution density, until the island patterns 161 are completely arranged in the first region B1; then, the second peripheral area spacer 152 is further arranged in the second region B2 between the first region B1 and the third region B3.

Figure 4:
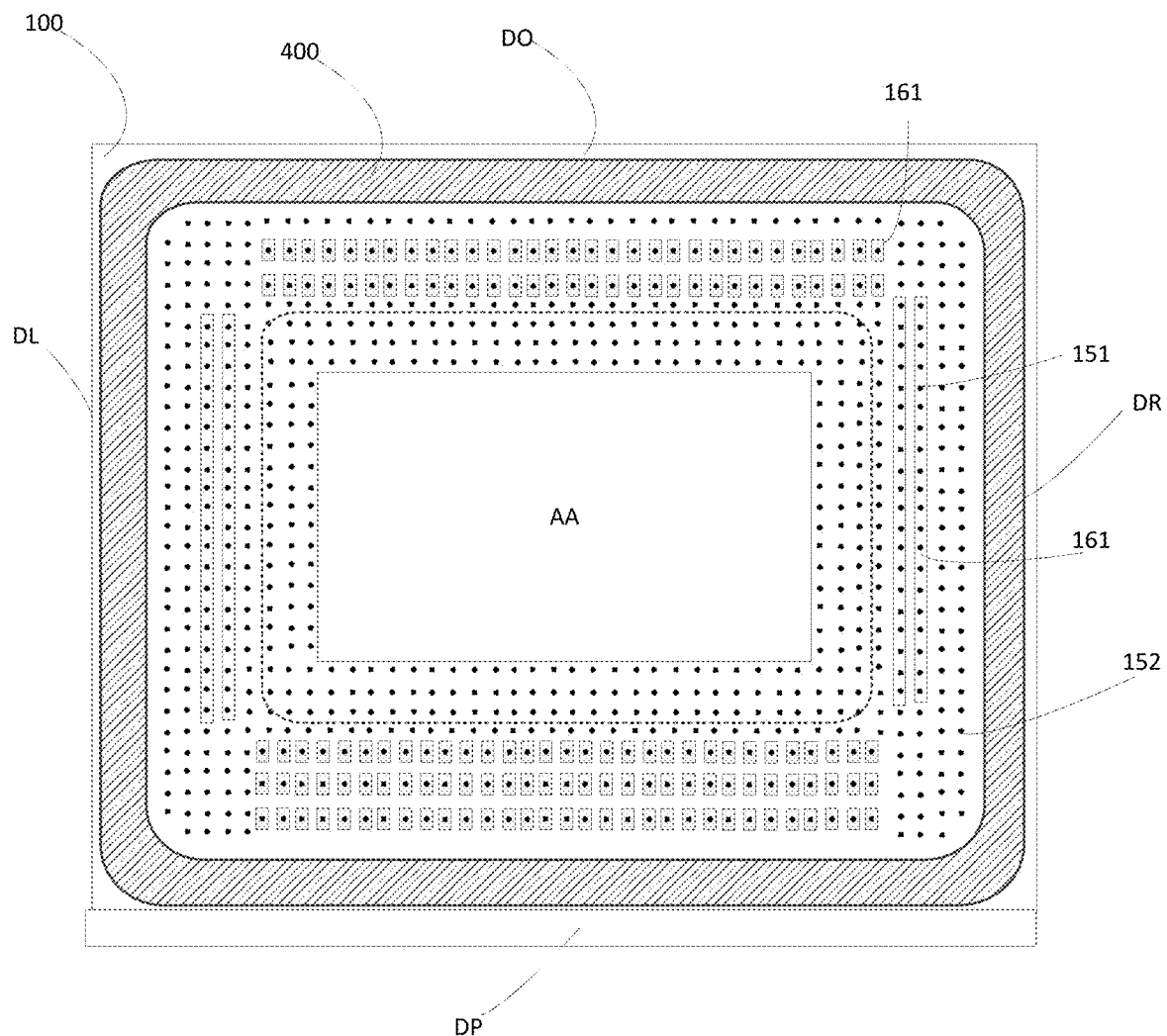
FIG. 4 is a schematic plan view of island patterns and spacers arranged in four sub-peripheral areas according to some embodiments.
Figure 5:
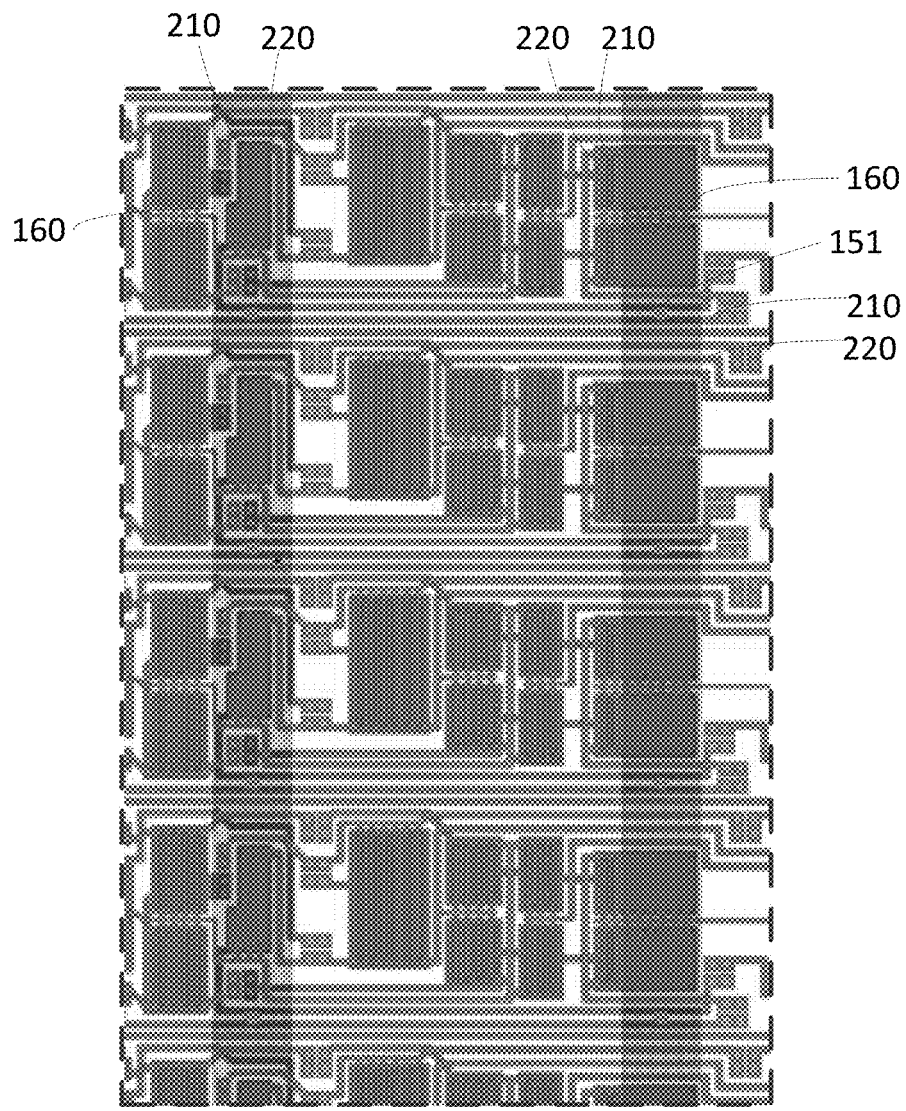
FIG. 5 illustrates a partial plan view of a peripheral area of a display panel in some embodiments.

FIG. 4 is a schematic plan view of island patterns and spacers arranged in four sub-peripheral areas according to some embodiments.

As shown in FIG. 4, at least part of the patterns of the insulating islands 160 in the binding area DP and the patterns of the insulating islands 160 in the opposite side area DO are symmetrically arranged with respect to the center of the display area; the patterns of the insulating islands 160 in at least part of the first side area DL and the patterns of the insulating islands 160 in the second side area DR are arranged symmetrically with respect to the center of the display area. With the above-mentioned solution, the support symmetry of the display panel can be ensured, so as to further improve the uniformity of cell gap.

In some exemplary embodiments, in the binding area DP, in a width direction extending from the first base substrate 110 to the display area, the island patterns 161 are sequentially arranged in N1 rows, and a row closest to the display area is a first row and a row farthest from the display area is a N1-th; in the opposite side area DO, along a width direction extending from the first base substrate 110 to the display area, the island patterns 161 are sequentially arranged in N2 rows, and a row closest to the display area 161 is a first row and a row farthest away from the display area is an N2-th row; wherein the first row of island patterns 161 in the binding area DP have a first distance L1 from the display area; a first row of island patterns 161 in the opposite side area DO have a second distance L2 from the display area; the first distance L1 is equal to the second distance L2.

In some exemplary embodiments, as shown in FIG. 3, N1 is greater than or equal to N2, and N2−N1=n, wherein the first to (N1-n)-th row of island patterns 161 in the binding area DP and the first to N2-th row of island patterns 161 in the opposite side area DO are symmetrically disposed about the center of the display area.

With the above-mentioned scheme, since the width of the binding area DP is generally larger than the other three sub-peripheral areas, the binding area DP can arrange the island pattern 161 and the first peripheral area spacer 151 which are completely symmetrical to the opposite side area DO, and it is also possible to arrange a plurality of n rows of the island pattern 161 in the redundant area near the edge of the first base substrate 110 to enhance the support of the bonding side.

By way of example, the peripheral area further comprises a third region B3, wherein the third region B3 is a region where the frame sealant sealed with the second substrate 200 is located; when n=1, in the binding area DP, the N1-th row of island patterns 161 is located at the center of the third region B3 and the (N1-1)-th row of island patterns 161 in the width direction of the binding area DP.

With the above-described scheme, the distance of the binding area DP is generally large, so that it is further supplemented with a row of island patterns 161 at the midline position of the inner side of the frame sealant and the last column near the edge of the first base substrate 110 compared to the opposite side area DO to reinforce the support of the binding side.

Furthermore, for example, in the first side area DL, along a width direction extending from the first base substrate 110 to the display area, the island patterns 161 are sequentially arranged in N3 columns, and a row closest to the display area is a first row and a row farthest away from the display area is an N3 column;

in the second side area DR, along a width direction extending from the first base substrate 110 to the display area, the island patterns 161 are sequentially arranged in N4 columns, and a row closest to the display area is a first row and a row farthest away from the display area is an N4 column; Wherein the first column of island patterns 161 in the first side area have a third distance L3 from the display area DL; the first column of island patterns 161 in the second side area DR have a fourth distance L4 from the display area; the first distance L1, the second distance L2, the third distance L3, and the fourth distance L4 are equal. With the above scheme, the support symmetry can be further improved.

In view of the above, by increasing the support of the peripheral area, the supporting environment around the peripheral area is ensured to be the same, so that the fluctuation of the cell gap of the product is reduced, so as to solve the problem of displaying the bright periphery of the product.

Illustratively, the second substrate 200 is an array substrate including a gate electrode layer 210, a source and drain metal layer 220, and an active layer 230, wherein the array substrate is provided with only one of the gate electrode layer 210, the source and drain metal layer 220, and the active layer 230 within the first region B1, and at least two of the gate electrode layer 210, the source and drain metal layer 220, and the active layer 230 within the second region B2.

Further, according to a second aspect of the present disclosure, there is provided a method for manufacturing the display panel provided in the embodiment of the present disclosure, the method including the steps of:

The step of manufacturing the first substrate 100 specifically comprises:

Step S01, providing a first base substrate 110;

Step S02, fabricating a black matrix 120, an insulating island 160 and a spacer on the first base substrate 110, wherein the black matrix 120 defines a plurality of opening patterns corresponding to the plurality of sub-pixels, the spacer comprises a peripheral area spacer 150 located in a peripheral area, the peripheral area spacer 150 comprises a plurality of first peripheral area spacers 151, the first peripheral area spacers 151 are located on a side of the black matrix 120 facing away from the first base substrate 110, and an insulating island 160 is also provided between the black matrix 120 and the first peripheral area spacers 151, the patterns of the insulating islands 160 comprises a plurality of island patterns 161 arranged at intervals to be isolated from each other, each of the island patterns 161 being correspondingly arranged between at least one of the first peripheral area spacers 151 and the black matrix 120 and coinciding with an orthographic projection of the corresponding first peripheral area spacer 151 on the first base substrate 110;

a step of manufacturing a second substrate, specifically comprising:

providing a second base substrate;

forming a conductive layer on the second base substrate, wherein the peripheral area comprises a first region and a second region, the number of conductive layers of the second substrate in the first region is less than the number of conductive layers in the second region, and a plurality of the first peripheral area spacers are provided in the first region.

Illustratively, in the method, step S02 specifically comprises:

Step S021, fabricating a black matrix 120 on the first base substrate 110, wherein the black matrix 120 comprises a first light-shielding pattern 121 located in the display area and a second light-shielding pattern 122 located in the peripheral area, the first light-shielding pattern 121 comprises the first light-shielding pattern 121 and the plurality of opening patterns, and the second light-shielding pattern 122 comprises the second light-shielding pattern 122 covering at least a partial area of the peripheral area on the whole;

Step S022, fabricating a color film 130 and an insulating island 160 on the first base substrate 110, wherein the film thickness of the color film 130 and the insulating island 160 in a direction perpendicular to the substrate is equal;

Step S023, fabricating a spacer on the first base substrate 110, the spacer comprising a display area spacer 140 and a peripheral area spacer 150, the display area spacer 140 comprising a main spacer 141 and an auxiliary spacer 142, the peripheral area spacer 150 further comprising a plurality of second peripheral area spacers 152 provided in a second region B2, the second region B2 being a region on the second substrate 200 where at least two conductive layers are provided in the peripheral area, and the auxiliary spacer 142 being located on a side of the color film facing away from the first base substrate 110.

Illustratively, in the method, step S022 specifically comprises: the island pattern 161 on the insulating island 160 is formed using the same patterning process as one of the plurality of color filtering patterns.

Illustratively, in the method, step S023 specifically comprises: forming the display area spacer 140 and the peripheral area spacer 150 in a same patterning process.

By way of example, the using the same patterning process to form the display area spacer 140 and the peripheral area spacer 150 specifically comprises:

Depositing a first material on the first base substrate 110 on which the island pattern 161 and the color film 130 are formed, wherein the first material is a material of the spacer, wherein part of the material flows out of the island pattern 161 when the first material is deposited, so that there is a gap between the island pattern 161 and a deposited film layer obtained on the deposition of the color film 130;

And patterning the deposited film layer by means of a semi-gray scale mask, forming a main spacer 141 and an auxiliary spacer 142 of the display area spacer 140, and a first peripheral area spacer 151 and a second peripheral area spacer 152 of the peripheral area spacer 150.

The following points need to be explained:
(1) The drawings relate only to the structures to which the embodiments of the present disclosure relate, and other structures may refer to general designs.
(2) In the drawings used to describe embodiments of the present disclosure, the thickness of layers or regions is exaggerated or reduced for clarity, i.e., the drawings are not to scale. It will be understood that when an element such as a layer, film, region or substrate is referred to as being "on" or "under" another element, it can be "directly on" or "directly under" the other element or intervening elements may be present.
(3) Without conflict, embodiments of the present disclosure and features of the embodiments may be combined with each other to provide new embodiments.

The foregoing is directed to particular embodiments of the present disclosure, but the scope of the disclosure is not limited thereto, and the scope of the disclosure is defined by the appended claims.

What is claimed is:

1. A display panel, comprising: a first substrate and a second substrate arranged in a cell, wherein the display panel has a display area and a peripheral area located at a periphery of the display area, and the display area comprises a plurality of sub-pixels arranged in an array;

the first substrate comprises a first base substrate, and a black matrix and a spacer arranged on the first base substrate, and the second substrate comprises a second base substrate and a conductive layer arranged on the second base substrate;

the black matrix defines a plurality of opening patterns corresponding to the plurality of sub-pixels, and the spacer comprises a display area spacer located in the display area and a peripheral area spacer located in the peripheral area;

the peripheral area comprises a first region and a second region, the number of conductive layers of the second substrate in the first region is less than the number of conductive layers in the second region, and the peripheral area spacer comprises a plurality of first peripheral area spacers provided in the first region; the first peripheral area spacer is located on a side of the black matrix facing away from the first base substrate, an insulating island is provided between the first peripheral area spacer and the black matrix, a pattern of the insulating island comprises a plurality of island patterns arranged at intervals to be isolated from each other, and each of the island patterns is correspondingly arranged between at least one of the first peripheral area spacers and the black matrix and coincides with an orthographic projection of the corresponding first peripheral area spacer on the first base substrate.

2. The display panel according to claim 1, wherein the first region comprises at least a partial region on the second substrate where only a single conductive layer is provided;

the second region comprises a region on the second substrate where at least two conductive layers are provided.

3. The display panel according to claim 1, wherein the black matrix comprises a first light-shielding pattern located in the display area and a second light-shielding pattern located in the peripheral area, the first light-shielding pattern comprises a light-shielding pattern and the plurality of opening patterns, the second light-shielding pattern on the whole covers at least a partial area of the peripheral area, and a thickness of the first light-shielding pattern in a direction perpendicular to the first base substrate is less than a thickness of the second light-shielding pattern in the direction perpendicular to the first base substrate; wherein, the display area spacer is located on a side of the first light-shielding pattern facing away from the first base substrate, and the peripheral area spacer is located on a side of the second light-shielding pattern facing away from the first base substrate.

4. The display panel according to claim 3, wherein the spacer further comprises a display area spacer located in the display area, the display area spacer comprises a main spacer and an auxiliary spacer, the main spacer has a third height h3 in the direction perpendicular to the first base substrate, the auxiliary spacer has a fourth height h4 in the direction perpendicular to the first base substrate, and the third height h3 is greater than the fourth height h4.

5. The display panel according to claim 4, wherein the peripheral area spacer further comprises a plurality of second peripheral area spacers provided in the second region; wherein, the first peripheral area spacer has a first height h1 in the direction perpendicular to the first base substrate;

the second peripheral area spacer has a second height h2 in the direction perpendicular to the first base substrate, the second height h2 is greater than the first height h1, the second peripheral area spacer is of a same material as the main spacer, and the second height h2 is equal to the third height h3.

6. The display panel according to claim 5, wherein the first substrate further comprises a color film provided on the first base substrate, wherein the color film comprises a plurality of color filtering patterns located on the plurality of opening patterns, and the spacer is located on a side of the color film facing away from the first base substrate.

7. The display panel according to claim 6, wherein the plurality of sub-pixels comprise a first sub-pixel for displaying light of a first color, a second sub-pixel for displaying light of a second color and a third sub-pixel for displaying light of a third color, and the plurality of color filtering patterns comprise at least a first color filtering pattern corresponding to the first sub-pixel, a second color filtering pattern corresponding to the second sub-pixel and a third color filtering pattern corresponding to the third sub-pixel; wherein the insulating island is arranged in a same layer and made of a same material as one color filtering pattern of the plurality of color filtering patterns.

8. The display panel according to claim 6, wherein the auxiliary spacer is located on a side of the color film facing away from the first base substrate, and a film thickness of the island pattern in the direction perpendicular to the first base substrate is equal to a film thickness of the color film in the direction perpendicular to the first base substrate; the first peripheral area spacer is provided in a same layer and made of a same material as the auxiliary spacer, the first height h1 is less than a predetermined value of the fourth height h4, and the predetermined value is configured as: when a first material is deposited on the island pattern and a side surface of the color film facing away from the first base substrate, the first material flows out of the island pattern when being deposited so that there is a gap between the island pattern and a deposited film layer on the color film, the first material is a material of the first peripheral area spacer and the auxiliary spacer, and the predetermined value is equal to a numerical value of the gap.

9. The display panel according to claim 1, wherein the peripheral area comprises four sub-peripheral areas surrounding four peripheral sides of the display area, a width direction of each of the sub-peripheral areas is along a direction from an edge of the first base substrate to the display area, and a length direction is a direction perpendicular to the width direction;

in at least one of the sub-peripheral areas, at least one of the island patterns is strip-shaped and extends along the length direction of the sub-peripheral area where the island pattern is located, two adjacent island patterns which are strip-shaped are successively arranged at intervals along the width direction of the sub-peripheral area where the island patterns are located, and each of the island patterns which is strip-shaped is provided with a plurality of first peripheral area spacers which are successively arranged at intervals along a length direction of the island pattern on a side facing away from the first base substrate; and/or in at least one of the sub-peripheral areas, at least one of the island patterns is block-shaped, and a plurality of the island patterns are arranged in a matrix along a length direction and a width direction of the sub-peripheral area where the island patterns are located; and each of the island patterns which is block-shaped is provided with at least one of the first peripheral area spacers on a side facing away from the first base substrate.

10. The display panel according to claim 9, wherein
in at least one of the sub-peripheral areas, a width of the strip-shaped island patterns is equal to a width of the sub-pixels in the width direction of the sub-peripheral area, a spacing between two adjacent strip-shaped island patterns in the width direction of the sub-peripheral area is equal to a pixel spacing of the plurality of sub-pixels in the width direction, and a distribution density of at least part of the first peripheral area spacers is equal to a pixel distribution density; and/or
in at least one of the sub-peripheral areas, a size of the block-shaped island pattern is equal to a size of the sub-pixel, and a spacing between two adjacent block-shaped island patterns is equal to a pixel spacing of the plurality of sub-pixels, and a distribution density of at least part of the first peripheral area spacers is equal to a pixel distribution density.

11. The display panel according to claim 10, wherein
the four sub-peripheral areas comprising: a binding area; an opposite side area opposite to the binding area; and a first side area and a second side area which are opposite to each other and located between the binding area and the opposite side area;
at least part of the patterns of the insulating islands in the binding area and the patterns of the insulating islands in the opposite side area are symmetrically arranged about a center of the display area;
at least part of the patterns of the insulating islands in the first side area and the patterns of the insulating islands in the second side area are symmetrically arranged about the center of the display area.

12. The display panel according to claim 11, wherein
in the binding area, along a width direction extending from the first base substrate to the display area, the island patterns are sequentially arranged in N1 rows, and a row closest to the display area is a first row and a row farthest away from the display area is an N1-th row;
in the opposite side area, along a width direction extending from the first base substrate to the display area, the island patterns are sequentially arranged in N2 rows, and a row closest to the display area is a first row and a row farthest away from the display area is an N2-th row; wherein
the first row of island patterns in the binding area have a first distance L1 from the display area; the first row of island patterns in the opposite side area have a second distance L2 from the display area; the first distance L1 is equal to the second distance L2.

13. The display panel according to claim 12, wherein
N1 is greater than or equal to N2, and N2−N1=n, wherein
the first to (N1-n)-th rows of island patterns in the binding area and the first to N2-th rows of island patterns in the opposite side area are symmetrically arranged about the center of the display area.

14. The display panel according to claim 13, wherein
the peripheral area further comprises a third region, wherein the third region is a region where a sealant sealed with the second substrate is located; when n=1, in the binding area, the N1-th row of island patterns are located at a center position of the third region and the (N1-1)-th row of island patterns in the width direction of the binding area.

15. The display panel according to claim 12, wherein
in the first side area, along a width direction extending from the first base substrate to the display area, the island patterns are sequentially arranged in N3 columns, and a row closest to the display area is a first row and a row farthest away from the display area is an N3 column;
in the second side area, along a width direction extending from the first base substrate to the display area, the island patterns are sequentially arranged in N4 columns, and a row closest to the display area is a first row and a row farthest away from the display area is an N4 column; wherein
the first column of island patterns in the first side area have a third distance L3 from the display area; the first column of island patterns in the second side area have a fourth distance L4 from the display area; the first distance L1, the second distance L2, the third distance L3, and the fourth distance L4 are equal.

16. A method for manufacturing the display panel according to claim 1, the method comprising:
a step of manufacturing a first substrate, specifically comprising:
providing a first base substrate;
fabricating a black matrix, an insulating island and a spacer on the first base substrate to form a first substrate, wherein the black matrix defines a plurality of opening patterns corresponding to the plurality of sub-pixels, the spacer comprises a peripheral area spacer located in the peripheral area, the peripheral area spacer comprises a plurality of first peripheral area spacers, the first peripheral area spacer is located on a side of the black matrix facing away from the first base substrate with an insulating island provided between the first peripheral area spacer and the black matrix, a pattern of the insulating island comprises a plurality of island patterns arranged at intervals to be isolated from each other, and each of the island patterns is correspondingly arranged between at least one of the first peripheral area spacers and the black matrix and coincides with an orthographic projection of the corresponding first peripheral area spacer on the first base substrate;
a step of manufacturing a second substrate, specifically comprising:
providing a second base substrate;
forming a conductive layer on the second base substrate, wherein the peripheral area comprises a first region and a second region, the number of conductive layers of the second substrate in the first region is less than the number of conductive layers in the second region, and a plurality of the first peripheral area spacers are provided in the first region.

17. The method according to claim 16, wherein in the method, the manufacturing a black matrix, an insulating island and a spacer on the first base substrate specifically comprises:
fabricating a black matrix on the first base substrate, wherein the black matrix comprises a first light-shielding pattern located in the display area and a second light-shielding pattern located in the peripheral area, the first light-shielding pattern comprises a light-shielding pattern and the plurality of opening patterns, the second light-shielding pattern covers at least a partial area of the peripheral area on the whole;
fabricating a color film and an insulating island on the first base substrate, wherein a film thickness of the color film and the insulating island in a direction perpendicular to the substrate is equal;
fabricating a spacer on the first base substrate, wherein the spacer comprises a display area spacer and a peripheral area spacer, the display area spacer comprises a main spacer and an auxiliary spacer, the peripheral area spacer further comprises a plurality of second peripheral area spacers provided in the second region, the second region is a region on the second substrate where at least two conductive layers are provided in the peripheral area, and the auxiliary spacer is located on a side of the color film facing away from the first base substrate.

18. The method according to claim 17, wherein in the method, the manufacturing a color film and an insulating island on the first base substrate specifically comprises:

forming the island patterns of the insulating island and one of the plurality of color filtering patterns in a same patterning process.

19. The method according to claim 17, wherein in the method, the manufacturing a spacer on the first base substrate specifically comprises:

forming the display area spacer and the peripheral area spacer in a same patterning process.

20. The method according to claim 19, wherein the forming the display area spacer and the peripheral area spacer in a same patterning process specifically comprises:

depositing a first material on the whole surface of the first base substrate formed with the island pattern and the color film, wherein the first material is a material of the spacer, wherein when the first material is deposited, part of the material flows out of the island pattern, so that there is a gap between the island pattern and a deposited film layer on the color film;

patterning the deposited film layer by means of a semi-gray scale mask to form the main spacer and the auxiliary spacer of the display area spacer, and the first peripheral area spacer and the second peripheral area spacer of the peripheral area spacer.

\* \* \* \* \*